United States Patent
Zheng et al.

(10) Patent No.: US 12,514,860 B2
(45) Date of Patent: *Jan. 6, 2026

(54) COMPOSITION CONTAINING LAMOTRIGINE, AND PREPARATION METHOD AND USE THEREOF

(71) Applicant: Shanghai Aucta Pharmaceuticals Co., Ltd., Shanghai (CN)

(72) Inventors: Xun Zheng, Shanghai (CN); Shaoqiong Lyu, Shanghai (CN); Boli Li, Shanghai (CN); Duoshuang Chen, Shanghai (CN)

(73) Assignee: SHANGHAI AUCTA PHARMACEUTICALS CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,097

(22) Filed: Apr. 17, 2024

(65) Prior Publication Data

US 2024/0261293 A1 Aug. 8, 2024

Related U.S. Application Data

(63) Continuation-in-part of application No. 18/555,659, filed as application No. PCT/CN2022/087326 on Apr. 18, 2022, which is a continuation of application No. 17/366,295, filed on Jul. 2, 2021, now Pat. No. 11,447,456.

(30) Foreign Application Priority Data

Apr. 16, 2021 (CN) .......................... 202110412683.1

(51) Int. Cl.
| | |
|---|---|
| A61K 31/53 | (2006.01) |
| A61K 9/10 | (2006.01) |
| A61K 45/06 | (2006.01) |
| A61K 47/02 | (2006.01) |
| A61K 47/12 | (2006.01) |
| A61K 47/26 | (2006.01) |
| A61K 47/38 | (2006.01) |

(52) U.S. Cl.
CPC ............. *A61K 31/53* (2013.01); *A61K 9/10* (2013.01); *A61K 45/06* (2013.01); *A61K 47/02* (2013.01); *A61K 47/12* (2013.01); *A61K 47/26* (2013.01); *A61K 47/38* (2013.01)

(58) Field of Classification Search
CPC .................. A61K 31/53; A61K 9/146
See application file for complete search history.

(56) References Cited

U.S. PATENT DOCUMENTS

| | | | | |
|---|---|---|---|---|
| 6,861,426 | B2* | 3/2005 | Garti | A61P 25/08 |
| | | | | 544/182 |
| 7,390,807 | B2* | 6/2008 | Garti | C07D 253/075 |
| | | | | 544/182 |
| 7,629,331 | B2* | 12/2009 | Pipkin | B01J 8/24 |
| | | | | 536/120 |
| 8,486,927 | B2 | 7/2013 | Hanna et al. | |
| 10,653,626 | B2* | 5/2020 | Lu | A61K 9/0095 |
| 11,447,456 | B1* | 9/2022 | Li, Sr. | A61K 47/38 |
| 2005/0238724 | A1* | 10/2005 | Aronhime | A61K 9/0019 |
| | | | | 514/242 |
| 2009/0312544 | A1 | 12/2009 | Van Deynse et al. | |
| 2012/0142919 | A1* | 6/2012 | Arnalot Aguilar | |
| | | | | C07D 253/075 |
| | | | | 544/182 |
| 2020/0375995 | A1* | 12/2020 | Sudhakar | A61K 47/36 |

FOREIGN PATENT DOCUMENTS

| | | | | |
|---|---|---|---|---|
| CN | 101506178 A | | 8/2009 | |
| CN | 101795673 A | | 8/2010 | |
| CN | 104940930 A | | 9/2015 | |
| CN | 106491539 A | * | 3/2017 | ............. A61K 31/53 |
| CN | 110545818 A | | 12/2019 | |
| CN | 113214177 A | | 8/2021 | |
| WO | WO-2005003104 A2 | * | 1/2005 | ......... C07D 253/075 |
| WO | 2008068619 A2 | | 6/2008 | |
| WO | WO-2016086193 A1 | * | 6/2016 | ................ A61J 3/02 |
| WO | WO-2018071547 A1 | * | 4/2018 | ............... A61K 9/10 |

OTHER PUBLICATIONS

Rani (Int. J. Chem Sci. vol. 11 pp. 751-760. Published 2013) (Year: 2013).*
Mesh to Micron conversion table (Year: 2022).*
Allen, L.V., "Lamotrigine 1 mg/mL Oral Suspension ", U.S. Pharmacist, May 15, 2015, vol. 40, No. 5, ISSN: 0148-4818, pp. 64-65.
Rani, et al: "Full Factorial Design in Formulation of Lamotrigine Suspension Using Locust Bean Gum", Int. J. Sci., Dec. 31, 2013, vol. 11, No. 2, ISSN: 0972-768X, pp. 751-760.

* cited by examiner

*Primary Examiner* — Clinton A Brooks
*Assistant Examiner* — George W Kosturko
(74) *Attorney, Agent, or Firm* — FOX ROTHSCHILD LLP

(57) ABSTRACT

The present disclosure provides a dry pharmaceutical composition, including a therapeutically effective amount of one or more lamotrigine hydrate crystals and one or more pharmaceutically acceptable excipients. The excipients include a thickener. The dry pharmaceutical composition is preferably a dry suspending agent. The dry pharmaceutical composition can be formulated into a suspension available for administration, which is stable for use for at least 1-3 months. The present disclosure further discloses methods for preparing the dry pharmaceutical composition and the dry suspending agent and use of the dry pharmaceutical composition and the dry suspending agent in the treatment of a neurological disease.

20 Claims, No Drawings

COMPOSITION CONTAINING LAMOTRIGINE, AND PREPARATION METHOD AND USE THEREOF

CROSS REFERENCE TO RELATED APPLICATIONS

This application is a continuation-in-part of U.S. patent application Ser. No. 18/555,659, filed Oct. 16, 2023, which is a US national entry of International Application No. PCT/CN2022/087326, filed Apr. 18, 2022, which is a Continuation of U.S. application Ser. No. 17/366,295, filed on Jul. 2, 2021, now U.S. Pat. No. 11,447,456, which also claims priority to Chinese Application No. 202110412683.1, filed on Apr. 16, 2021, the contents of which are incorporated herein by reference in their entirety.

FIELD OF THE INVENTION

The present disclosure relates to the field of pharmaceutical preparations, and in particular to a dry composition and dry suspending agent containing lamotrigine, a preparation method thereof, and use in the treatment of diseases.

BACKGROUND

Epilepsy is one of the most common of the neurological diseases. Epileptic seizures may lead to a progressive decline in brain function, causing cognitive impairment and mental decline. Sudden epileptic seizures easily cause accidental injuries, and status epilepticus can be life-threatening, seriously affecting the patients' quality of life and usually requiring patients to be on medication for life.

Lamotrigine (trade name Lamictal) exerts its antiepileptic effects primarily by blocking voltage-gated sodium channels, reducing sodium inward flow and increasing neuronal stability. Lamotrigine was marketed in Europe in 1991 and in the United States in 1994. Currently, lamotrigine is comparable to phenytoin and carbamazepine as monotherapy or adjunctive therapy for many types of epilepsy, especially in infants, adolescents, and elderly patients.

At present, there are four dosage forms of lamotrigine approved for marketing both at home and abroad, namely, plain tablets, chewable tablets, orally disintegrating tablets and extended-release tablets. There is no oral liquid preparation of lamotrigine in the market, so it is often necessary to mill lamotrigine tablets to prepare the liquid preparation before when use for pediatric patients and patients with dysphagia. However, such improvised preparations are prone to inaccurate dosage of administration and contamination of the drug.

Lamotrigine is a Biopharmaceutics Classification System (BCS) Class II drug that is poorly soluble in aqueous media. Decreasing the pH can increase partial solubility, but with limited effect. Chinese patent application Nos. CN201510288845.X and CN201510350210.8 respectively disclose a prescription and a preparation method of a lamotrigine oral solution. The drug concentration of this preparation is less than 2 mg/mL, which cannot meet the needs of clinical medication. If a highly concentrated prescription is required, an organic solvent needs to be added, which is not conducive to children.

Single-dose products developed with lamotrigine anhydrate also have a number of drawbacks that cannot be avoided. If the patient's weight is low, there will be a large amount of single-dose product left each time, which may waste the drug or make the patient take the single-dose product several times. Moreover, for a single-dose dry suspending agent, the patient needs to add water for reconstitution before each use, which causes some inconvenience to his life and poor patient compliance. In contrast, multi-dose products can significantly improve patient compliance; and there is basically no waste of drug, and the patients do not have to continue taking medication beyond the expiration date after opening for fear of wasting it. Moreover, a multi-dose dry suspending agent only needs to be reconstituted before the first dose, and then taken normally according to the pharmacist's suggestion in the subsequent medication process, which is more convenient and faster and can significantly improve the patient compliance.

It is not ideal to develop multi-dose suspending agents with lamotrigine anhydrate. The inventors of the present disclosure found through experiments that, when a lamotrigine suspension was prepared by conventional methods, no lumpy crystals were observed at the time of preparation. But after it was placed at room temperature for 3 days, a large number of lumpy crystals appeared, and the crystals had a tendency to become bigger as time went on, which would lead to the patient not being able to accurately take the drug. Chinese patent application CN106491539B discloses a method for inhibiting hydrate, but the inhibition can only be maintained for 24 h, which causes inconvenience to patients for long-term medication.

For an active pharmaceutical ingredient (API), its crystalline state can affect many of its properties such as melting point, solubility, stability and bioavailability. Eutectic or hydrate of a drug can utilize hydrogen bonds or other noncovalent bonds to effectively improve the crystalline properties and physical and chemical properties of the drug without destroying the API, and thus has become a hot spot in the research and development of pharmaceutical solid preparations.

So far, many kinds of eutectic of lamotrigine have been reported. Salts of lamotrigine that have been reported are: 1:1 lamotrigine-4-hydroxybenzoic acid, 1:1 lamotrigine-saccharin, 1:3 lamotrigine-acetic acid, 1:1 lamotrigine-propionic acid, 2:1 lamotrigine-adipic acid, 2:1 lamotrigine-malic acid, 1:1 lamotrigine-malic acid, 1:1 lamotrigine-methyl paraben, 1:1 lamotrigine-nicotine, 1:1:1 lamotrigine-nicotine-hydrate and 1:1 lamotrigine-acetamide. Solvates of lamotrigine that have been reported are: 1:2 lamotrigine methanol solvate and 1:1:1 lamotrigine-ethanol-hydrate. However, the above eutectic failed in further research and develop of liquid dosage forms, and failed to solve the problem of administration accuracy of lamotrigine multi-dose liquid preparations.

WO 2022/218437 discloses a crystal form of lamotrigine hydrate, a preparation method thereof and a composition containing the same. However, the inventors of the present disclosure have found that the suspending agent prepared from this composition has poor stability in water and cannot well meet the needs of administration.

SUMMARY OF THE INVENTION

The inventors of the present disclosure have conducted extensive and in-depth research on this, thus completing the present disclosure.

In a first aspect, the present disclosure provides a dry pharmaceutical composition, including a therapeutically effective amount of one or more lamotrigine hydrate crystals and one or more pharmaceutically acceptable excipients. The excipients include a thickener.

The lamotrigine hydrate crystal and the thickener in the dry pharmaceutical composition can make a final dry suspending agent a uniform suspension after reconstituted, which can be stable for a long time. The suspension available for administration reconstituted from the dry suspending agent is stable for use for at least 1-3 months.

In some specific embodiments, the pharmaceutical composition further includes a pH modifier.

In some specific embodiments, the dry pharmaceutical composition is a dry suspending agent. Preferably, the dry suspending agent further includes a filler, a preservative, a flow aid, a defoamer and/or a flavoring agent.

In some specific embodiments, the lamotrigine hydrate crystal has a particle size (D90) of about 1-200 μm.

In some specific embodiments, a weight ratio of the lamotrigine hydrate crystal to the thickener is about from 10:1 to 10:7.

In some specific embodiments, when the pharmaceutical composition further includes the pH modifier, a weight ratio of the lamotrigine hydrate crystal to the pH modifier is about from 10:0.1 to 10:8.

In some specific embodiments, the thickener is selected from hydrocolloids, such as xanthan gum, guar gum, locust bean gum and carrageenan; cellulose derivatives, such as sodium carboxymethyl cellulose, hydroxypropyl cellulose, methyl cellulose and hydroxypropyl methylcellulose; polysaccharides, such as starch and pregelatinized starch; alginates, such as sodium alginate; acrylic copolymers, such as carbomer; povidone; and magnesium aluminum silicate and combinations thereof. Preferably, the thickener is selected from xanthan gum, povidone, sodium carboxymethyl cellulose, sodium alginate, magnesium aluminum silicate and/or carbomer.

In some specific embodiments, the pharmaceutical composition includes the following excipients:
  about 1-5 parts by weight of xanthan gum;
  about 10-80 parts by weight of mannitol;
  about 10-80 parts by weight of microcrystalline cellulose;
  about 10-80 parts by weight of lactose;
  about 1-5 parts by weight of sucralose;
  about 1-5 parts by weight of orange essence;
  about 1-3 parts by weight of a combination of methylparaben sodium and propylparaben sodium, a weight ratio of the methylparaben sodium to the propylparaben sodium being about 9:1;
  about 0.1-5 parts by weight of silicon dioxide; and
  about 0.01-3 parts by weight of simethicone emulsion.

In some implementations, the composition further includes one or more other drugs selected from oxcarbazepine, carbamazepine, topiramate and lacosamide.

In some embodiments, the composition may also be formulated into dosage forms such as tablets, capsules, powders, granules and suspending agents. In a second aspect, the present disclosure provides a method for preparing a dry pharmaceutical composition, including:
  (a) providing a lamotrigine anhydrate, and adding the lamotrigine anhydrate into water to obtain a lamotrigine hydrate crystal, and/or directly providing a lamotrigine hydrate crystal;
  (b) mixing the lamotrigine hydrate crystal with a first series of pharmaceutically acceptable excipients, carrying out wet granulation, and drying the obtained granules with a fluidized bed or an oven;
  (c) milling the granules to a particle size (D90) of about 1-400 μm; preferably a particle size of about 30 um, 70 um or 110 um;
  (d) mixing the milled granules with a second series of excipients to obtain the dry pharmaceutical composition, where the second series of excipients includes at least a thickener, which makes the dry pharmaceutical composition, such as a dry suspending agent, a uniform suspension after reconstituted.

The dry pharmaceutical composition can be formulated into the dry suspending agent according to the conventional technical means in the art.

Therefore, in another aspect, the present disclosure provides a method for preparing the dry suspending agent, where
  the pharmaceutically acceptable excipients in steps (b) are the first series of excipients selected from one or a combination of more of a filler, a sweetener, a pH modifier, a preservative, a flow aid, a defoamer, a flavoring agent and a surfactant.

In some specific embodiments, the granules in step (c) mainly include the lamotrigine hydrate crystal.

In some specific embodiments, the second series of excipients further includes one or more excipients selected from a thickener, a sweetener, a pH modifier, a preservative, a flow aid, a defoamer and a flavoring agent.

In some specific embodiments, a weight ratio of the lamotrigine hydrate crystal to the pH modifier is about from 10:0.1 to 10:8, and/or a weight ratio of the lamotrigine hydrate crystal to the thickener is about from 10:1 to 10:7.

In some specific embodiments, the thickener is selected from hydrocolloids, such as xanthan gum, guar gum, locust bean gum and carrageenan; cellulose derivatives, such as sodium carboxymethyl cellulose, hydroxypropyl cellulose, methyl cellulose and hydroxypropyl methylcellulose; polysaccharides, such as starch and pregelatinized starch; alginates, such as sodium alginate; acrylic copolymers, such as carbomer; povidone; and magnesium aluminum silicate and combinations thereof.

In some specific embodiments, the lamotrigine hydrate crystal accounts for 1% to 80% in the composition.

In some specific embodiments, the dry pharmaceutical composition is reconstituted into a suspending agent, which is stable for use for at least 1-3 months.

The present disclosure also provides other methods for preparing a lamotrigine dry suspending agent, as described in the technical solutions below.

A method for preparing a lamotrigine dry suspending agent includes the following steps: making lamotrigine form a lamotrigine hydrate suspension, then adding the lamotrigine suspension as a slurry into a filler, and carrying out wet granulation; and drying the granules, milling the granules, mixing the milled granules with pharmaceutically acceptable excipients to obtain the lamotrigine dry suspending agent composition.

In some embodiments, the lamotrigine granules have a particle size D90 of not greater than 200 um.

In some embodiments, the lamotrigine hydrate crystal may be in the form of a specific hydrate crystal or a combination of multiple hydrate crystals.

In some embodiments, the milling includes pin milling, hammer milling and cutter milling.

In some embodiments, the filler (or diluent) is selected from starch, such as corn starch; sugar alcohols, such as sucrose, lactose and mannitol; cellulose, such as microcrystalline cellulose; and inorganic salts, such as calcium sulfate and calcium hydrogen phosphate.

The present disclosure provides another method for preparing a lamotrigine dry suspending agent, including the following steps: making lamotrigine form a lamotrigine hydrate suspension, filtering the lamotrigine hydrate suspension, drying the solid, milling the dried lamotrigine hydrate crystal, and mixing the milled material with pharmaceutically acceptable excipients to obtain the lamotrigine dry suspending agent composition.

In some embodiments, the lamotrigine hydrate crystal includes all lamotrigine hydrate crystal forms.

In some embodiments, the lamotrigine hydrate crystal has a particle size D90 of not greater than 200 um.

In some embodiments, the milled lamotrigine hydrate crystal granules have a particle size D90 of not greater than 400 um.

In some embodiments, the lamotrigine hydrate crystal may be in the form of a specific hydrate crystal or a combination of multiple hydrate crystals.

In some embodiments, the milling includes pin milling, hammer milling and cutter milling.

The present disclosure provides yet another method for preparing a lamotrigine dry suspending agent, including the following step: directly mixing a lamotrigine hydrate crystal with pharmaceutically acceptable excipients to obtain the lamotrigine dry suspending agent composition.

In some embodiments, the lamotrigine hydrate crystal may be in the form of a specific hydrate crystal or a combination of multiple hydrate crystals.

In some embodiments, the lamotrigine hydrate crystal has a particle size D90 of not greater than 200 um.

In a third aspect, the present disclosure provides a method for treating a neurological disease, including administering a therapeutically effective amount of the lamotrigine dry composition of the present disclosure to a subject in need thereof.

In some specific embodiments, the neurological disease is selected from one or more of Alzheimer's disease, depression, multiple sclerosis, Parkinson's disease and epilepsy.

In some specific embodiments, the drug available for administration to the patient may further be selected from one or more of oxcarbazepine, carbamazepine, phenytoin, valproic acid, ethosuximide, felbamate, gabapentin, levetiracetam, tiagabine, pregabalin, phenobarbital, zonisamide, clonazepam, phenytoin sodium, sodium valproate, clobazam, vigabatrin, topiramate and lacosamide.

In a fourth aspect, the present disclosure provides use of the lamotrigine dry composition of the present disclosure in the preparation of a drug for the treatment of a neurological disease.

In some specific embodiments, the neurological disease is selected from one or more of Alzheimer's disease, depression, multiple sclerosis, Parkinson's disease and epilepsy.

In some specific embodiments, the drug available for administration to the patient may further be selected from one or more of oxcarbazepine, carbamazepine, phenytoin, valproic acid, ethosuximide, felbamate, gabapentin, levetiracetam, tiagabine, pregabalin, phenobarbital, zonisamide, clonazepam, phenytoin sodium, sodium valproate, clobazam, vigabatrin, topiramate and lacosamide.

In a fifth aspect, the present disclosure provides use of the lamotrigine dry composition of the present disclosure in the treatment of a neurological disease.

In some embodiments, the neurological disease is selected from one or more of Alzheimer's disease, depression, multiple sclerosis, Parkinson's disease and epilepsy.

In some embodiments, the drug is used in combination with other drugs in the treatment of the neurological disease.

In some embodiments, the drug is in the form of a dry suspending agent or a suspending agent.

In some embodiments, more than about 80% of lamotrigine in the drug exists in the form of a lamotrigine hydrate crystal.

DETAILED DESCRIPTION OF THE PREFERRED EMBODIMENTS

Unless otherwise defined, all technical and scientific terms used herein have the same meaning as commonly understood by those skilled in the art to which the present disclosure belongs. In case of conflict, the definitions provided in this application shall prevail.

The term "comprise", "include", "have", "contain" or "involve" as used herein and other variants thereof are inclusive or open-ended and do not exclude other unlisted elements or method steps.

As used herein, the term "about" means within what those of ordinary skill in the art would consider to be an acceptable standard error of the stated value, e.g., ±0.05, ±0.1, ±0.2, ±0.3, ±0.5, ±1, ±2, ±3 or the like.

As used herein, the term "suspending agent" refers to the distribution of a solid drug in the form of particles in a liquid preparation. As used herein, the term "dry suspending agent" refers to a powdery substance made from a solid drug and suitable pharmaceutical excipients. This powdery substance, when mixed with a solvent, such as water, can be dispersed to form a suspension for administration to a patient, e.g., oral administration. The lamotrigine dry suspending agent herein refers to a powdery substance containing lamotrigine granules.

As used herein, the term "D90" means that 90% of lamotrigine granules have a diameter smaller than the particle size.

An aspect of the patent document provides a method of preparing a powder for reconstitution into a suspension, comprising:
  (a) providing particles comprising lamotrigine hydrate optionally admixed with a first set of excipients;
  (b) processing the particles so that their D90 is less than 500 um; and
  (c) mixing the processed particles with a second set of excipients comprising at least a thickener to obtain the powder as a uniform mixture.

In some embodiments, the lamotrigine hydrate of the particles of step (a) is admixed with the first set of excipients comprising one or more excipients selected from the group consisting of a filler, a sweetener, a pH modifier, a preservative, a glidant, an anti-forming agent, a flavoring agent, and a surfactant. In some embodiments, the particles of step (a) are free from any thickener.

In some embodiments, the particles of step (a) are essentially free from any thickener. In other words, even if there is a thickener in the particles, the amount of the thickener is not enough to change any property of the particles.

The first series of excipients may include one or more of a filler, a sweetener, a pH modifier, a preservative, a flow aid, a defoamer and a flavoring agent.

The second series of excipients generally includes a thickener, and optionally one or more of a sweetener, a pH modifier, a preservative, a flow aid, a defoamer and a flavoring agent.

The lamotrigine hydrate may be in the form of any hydrate. The granules in step (a) may include one or more forms of hydrates. The granules or particles of step (a) can be prepared by any suitable means including for example wet granulation, and drying the obtained granules with a fluidized bed or an oven.

The milling process in step (b) may include stirring, screening, cutting, grinding, pressurizing and any one or more other manners to control the particle size. In some embodiments, the milled material has a particle size D90 of less than 400 um, less than 300 um, less than 250 um, less than 200 um, less than 180 um, less than 150 um, less than 100 um, less than 80 um, less than 50 um, less than 30 um, less than 20 um or less than 10 um, including but not limited to a particle size D90 of about 1 um, about 2 um, about 5 um, about 10 um, about 20 um, about 50 um, about 60 um, about 80 um, about 100 um, about 110 um, about 120 um, about 150 um, about 200 um, about 250 um and any particle size D90 within the range between two of the above particle sizes. In some embodiments, the milled material has a particle size D90 of about 30 um, about 70 um or about 110 um.

The lamotrigine in step (a) may be milled into granules with a suitable particle size before or after mixed with the excipients. In some embodiments, the lamotrigine hydrate granules in step (a) are mixed with the first series of excipients. In some embodiments, the lamotrigine hydrate granules in step (a) are not mixed with the first series of excipients, and the lamotrigine hydrate in step (a) is directly subjected to the operation in step (b). In some examples, the granules in step (a) mainly include a lamotrigine hydrate.

The first series of excipient and/or the second series of excipients may include a pH modifier. A weight ratio of the lamotrigine to the pH modifier is about 10:0.1 to 10:8, including but not limited to 10:0.1, 10:0.2, 10:0.5, 10:0.8, 10:1, 10:1.5, 10:2, 10:3, 10:4, 10:5, 10:6, 10:7, 10:8 and any ratio within the range between two of the above ratios. A pH of the suspension is about 3.0 to 8.0, including but not limited to, about 3.0, about 3.5, about 4.0, about 4.5, about 5.0, about 5.5, about 6.0, about 6.5, about 7.0, about 7.5 or about 8.0. More preferably, the pH is 4.0 to 6.0.

The thickener functions to stabilize the lamotrigine hydrate crystal granules in the suspension. Suitable thickeners include, but not limited to hydrolyzed colloids, such as xanthan gum, guar gum, locust bean gum and carrageenan; cellulose derivatives, such as sodium carboxymethyl cellulose, hydroxypropyl cellulose, methyl cellulose and hydroxypropyl methyl cellulose; polysaccharides, such as starch and pre-gelatinized starch; alginate, such as sodium alginate; acrylic copolymers, such as carbomer; aluminum magnesium silicate and its combination. In some examples, the thickener is selected from xanthan gum, sodium carboxymethyl cellulose, sodium alginate and magnesium aluminum silicate.

A weight ratio of the lamotrigine hydrate crystal to the pH modifier is about 10:1 to 10:8, including but not limited to about 10:1, about 10:2, about 10:3, about 10:4, about 10:5, about 10:6, about 10:7, about 10:8 and any ratio within the range between two of the above ratios.

In some embodiments, the lamotrigine hydrate ranges from 1% to 80%, from 5% to 50%, from 5% to 60%, from 10% to 50%, or from 20% to 40% by weight in the uniform mixture. Nonlimiting examples of the lamotrigine hydrate in the mixture by weight include about 2%, about 5%, about 10%, about 15%, about 20%, about 25%, about 30%, about 40%, about 50%, about 60%, about 70%, about 80%, or any range between any two of the aforementioned percentage values.

In some embodiments, the method further includes: before step (a), preparing a lamotrigine anhydrate into a lamotrigine hydrate, including adding the lamotrigine anhydrate into water, to obtain a lamotrigine hydrate suspension; and then, separating the lamotrigine hydrate from the suspension, removing excess water, drying the lamotrigine hydrate, and treating the obtained granules to an appropriate particle size D90 as specified above. In some embodiments, the initial lamotrigine anhydrate used has a particle size D90 of less than 800 um, less than 600 um, less than 500 um, less than 400 um, less than 300 um, less than 250 um, less than 200 um, less than 180 um, less than 150 um, less than 100 um, less than 80 um, less than 50 um, less than 30 um, less than 20 um or less than 10 um, including but not limited to a particle size D90 of lamotrigine anhydrate used in some embodiments of about 1 um, about 2 um, about 3 um, about 5 um, about 10 um, about 20 um, about 50 um, about 60 um, about 80 um, about 100 um, about 110 um, about 120 um, about 150 um, about 200 um, about 250 um and any particle size D90 within the range between two of the above particle sizes.

Optionally, the suspension containing the lamotrigine hydrate is mixed with the first series of excipients to obtain wet granules, and after excess water is removed and the wet granules are dried, the lamotrigine hydrate granules mixed with the first series of excipients are obtained. In some examples, the separated lamotrigine hydrate may be mixed with the first series of excipients to prepare wet granules, and after the wet granules are dried, the granules containing the lamotrigine hydrate are treated into the above-mentioned granules with a suitable particle size D90.

The treated granules with a suitable particle size D90 are mixed with a thickener and optionally one or more excipients, such as a sweetener, a pH modifier, a preservative, a flow aid, a defoamer and a flavoring agent. The mixture is uniformly mixed by shaking or other processing steps. Then, the mixture may be passed through a screen having a mesh size of less than 2000 um, less than 1500 um, less than 1000 um, less than 800 um, less than 600 um, less than 500 um, less than 400 um, less than 300 um or less than 200 um, including but not limited to a screen used in some embodiments having a mesh size of about 800 um, about 700 um, about 600 um, about 500 um, about 450 um, about 400 um, about 350 um, about 300 um, about 200 um, about 100 um and any mesh size within the range between two of the above mesh sizes.

A related aspect provides a method for preparing the composition or granules, which can form a stable lamotrigine hydrate suspension after mixed with water. The particle size D90 of the lamotrigine hydrate granules is less than a certain value within a period of time. The specific preparation steps have been described in the above method. In some embodiments, after the granules are mixed with water, the lamotrigine hydrate in the reconstituted suspension for administration has a particle size D90 of less than 400 um, less than 300 um, less than 200 um, less than 180 um, less than 150 um, less than 100 um, less than 80 um, less than 50 um, less than 30 um, less than 20 um or less than 10 um, including but not limited to a particle size D90 in some embodiments of about 1 um, about 2 um, about 3 um, about 5 um, about 10 um, about 20 um, about 50 um, about 60 um, about 80 um, about 100 um, about 110 um, about 120 um, 150 um, about 200 um and any particle size D90 within the range between two of the above particle sizes. In some embodiments, the lamotrigine hydrate granules in the reconstituted suspension formed by mixing powder and water can be maintained within a stable particle size range for at least 1 day, at least 2 days, at least 5 days, at least 7 days, at least 10 days, at least 20 days, at least 1 month, at least 2 months, at least 3 months, at least 4 months, at least 5 months, at least 6 months, at least 8 months, at least 10 months or at least 12 months. By adjusting one or two parameters (for example, the particle size of the initial lamotrigine hydrate before mixed with the other excipients in different ratios) in the operation process, the D90 of the granules and/or the stability of the granules in the reconstituted suspension can be controlled.

Another aspect of the present disclosure provides lamotrigine hydrate granules and a composition for preparing a suspension. The granules may be prepared according to the method disclosed herein.

Another aspect of the present disclosure provides a method for treating a neurological disease, including preparing a suspension from the dry composition prepared according to the part disclosed herein. In some examples, the neurological disease is selected from one or more of Alzheimer's disease, depression, multiple sclerosis, Parkinson's disease and epilepsy. In some examples, the drug available for administration to the patient may further be selected from one or more of oxcarbazepine, carbamazepine, phenytoin, valproic acid, ethosuximide, felbamate, gabapentin, levetiracetam, tiagabine, pregabalin, phenobarbital, zonisamide, clonazepam, phenytoin sodium, sodium valproate, clobazam, vigabatrin, topiramate and lacosamide.

The following examples are only used to further illustrate the present disclosure, but do not limit the scope of the present disclosure to these examples. The raw materials and reagents used in the present disclosure may be commercially available.

Experimental Example—1 Preparation of Dry Suspending Agents by Different Processes Process of the present disclosure (Group 1): 10 parts by weight of lamotrigine anhydrate with (D90) of 8 um was added to 30 parts by weight of purified water, and stirred for dispersion at a stirring speed of 800 rpm at room temperature for 3 h.

The resulting suspension was added as a slurry to a mixture of 20 parts by weight of mannitol, 20 parts by weight of lactose and 20 parts by weight of microcrystalline cellulose, and wet granulation was carried out at a stirring speed of 150 rpm and a shearing speed of 1500 rpm. After the completion of the wet granulation, the wet soft material was passed through a 6250 um screen. The wet soft material was dried with a fluidized bed, the inlet air temperature of which was set to 60° C. Then, the dried granules were milled by a mill to a particle size D90 of about 70 um.

The milled material and other materials (in parts by weight) in Table 5 below were placed in a hopper with a suitable size, mixed at a speed of 20 rpm for 5 min, and passed through a 457 um screen. Then, the undersize was further mixed in the hopper for 10 min to obtain dry suspending agent powder that could be canned.

Process of WO 2022/218437 in the prior art (Group 2): 10 parts by weight of lamotrigine anhydrate with (D90) of 8 um was used. The formula is shown in Table 5. All the materials in the formula were placed in a hopper with a suitable size, mixed at a speed of 20 rpm for 5 min, and passed through a 457 um screen. Then, the undersize was placed in the hopper and mixed for 10 min to obtain dry suspending agent powder that could be canned.

A proper amount of the dry suspending agent granules prepared by the above two processes were respectively weighed and added to 500 ml glass bottles, and placed in stability chambers at 25° C./60% RH and 30° C./65% RH for stability testing. The dry suspending agent granules in the two glass bottles were respectively taken out after 6 months, and shaken with water to prepare suspensions. The suspensions were tested for their content and impurities. The results are shown in the table below.

TABLE 5

| | Group | |
|---|---|---|
| | 1 | 2 |
| Particle size D90 of API lamotrigine (um) | 8.3 | 8.3 |
| Lamotrigine | 10 | 10 |
| Mannitol | 20 | 20 |
| Lactose monohydrate | 20 | — |
| Microcrystalline cellulose | 20 | — |
| Particle size D90 of milled intermediate (um) | 71.7 | — |
| Sucralose | 1 | 1 |
| Xanthan gum | 3 | 3 |
| Silicon dioxide | 1 | 1 |
| Orange essence | 0.5 | 0.5 |
| Citric acid | 2.5 | 2.5 |
| Disodium hydrogen phosphate | 1.5 | 1.5 |
| Simethicone emulsion | 1.6 | — |
| Methylparaben sodium | 2 | 2 |
| Propylparaben sodium | 0.2 | 0.2 |

TABLE 6

Content data in stability testing

| | | Point 0 | | | 25° C./60RH-6 M | | | 30° C./65RH-6 M | | |
|---|---|---|---|---|---|---|---|---|---|---|
| | | Assay % | Mean % | RSD % | Assay % | Mean % | RSD % | Assay % | Mean % | RSD % |
| Group 1 | | 98.1 | 98.2 | 0.2 | 100.5 | 100.6 | 0.1 | 100.1 | 100.0 | 0.2 |
| | | 98.4 | | | 100.5 | | | 99.8 | | |
| | | 98.1 | | | 100.7 | | | 100.0 | | |
| Group 2 | | 102.1 | 102.2 | 0.2 | 97.8 | 106.6 | 7.9 | 124.7 | 150.5 | 17.6 |
| | | 102.5 | | | 107.3 | | | 149.2 | | |
| | | 102.1 | | | 114.7 | | | 177.7 | | |

TABLE 7

Impurity data in stability testing

| Impurity | Acceptable criteria | Group 1 25° C./ 60RH-6 M | Group 2 25° C./ 60RH-6 M | Group 1 30° C./ 65RH-6 M | Group 2 30° C./ 65RH-6 M |
|---|---|---|---|---|---|
| Impurity-C | ≤0.2% | ND | ND | 0.10 | ND |
| Impurity-B | ≤0.2% | ND | ND | ND | ND |
| Individual impurity | ≤0.2% | 0.02 | ND | 0.06 | 0.05 |
| Total impurities | ≤0.75% | 0.02 | ND | 0.23 | 0.05 |

Note:
ND means that no impurities are detected or the impurity content is extremely low and less than the detection range.

The lamotrigine dry suspending agents were prepared according to the above method by 2 different processes based on the formulae in Table 5. As can be seen from the results in Table 6, in the suspension reconstituted from the dry suspending agent prepared by the process in the prior art patent, the content is not uniform, and RSD>5%, which does not meet the criteria for the suspension content uniformity. In the suspension reconstituted from the dry suspending agent prepared by the process of the present disclosure, the content is uniform, and RSD<1.0. As can be seen from the results in Table 7, in both the lamotrigine dry suspending agents prepared by the 2 different processes, the impurities are within the normal ranges. As a result, according to the above result data of stability testing of this example, the lamotrigine dry suspending agent product prepared by the process of the present disclosure is more stable.

Embodiment 1—Preparation of Dry Suspending Agents by Wet Granulation Using Lamotrigine Anhydrates with Different Particle Sizes 10 parts by weight of lamotrigine anhydrates with (D90) of 4 um, 60 um and 150 um were respectively added to 30 parts by weight of purified water, and stirred for dispersion at a speed of 800 rpm at room temperature for 3 h to obtain lamotrigine hydrate crystals. A series of characteristic peaks of the anhydrate in the XRPD spectrum at diffraction angles (2θ) of 12.3±0.2°, 13.7±0.2°, 16.5±0.2°, 17.3±0.2° and 17.8±0.2° were not obvious in the hydrate crystal, and the hydrate had a series of characteristic peaks of hydrate at diffraction angles (2θ) of 10.69±0.2°, 13.12±0.2° and 15.73±0.2°, indicating that the lamotrigine anhydrate had transformed into the hydrate crystal.

The resulting suspension was added as a slurry to a mixture of 20 parts by weight of mannitol, 20 parts by weight of lactose and 20 parts by weight of microcrystalline cellulose, and wet granulation was carried out at a stirring speed of 150 rpm and a shearing speed of 1500 rpm. After the completion of the wet granulation, the wet soft material was passed through a 6250 um screen. The wet soft material was dried with a fluidized bed, the inlet air temperature of which was set to 60° C. Then, the dried granules were milled by a mill to a particle size D90 of about 70 um.

The milled material and other materials (in parts by weight) in Table 1 below were placed in a hopper with a suitable size, mixed at a speed of 20 rpm for 5 min, and passed through a 475 um screen. Then, the undersize was further mixed in the hopper for 10 min to obtain a dry suspending agent powder material that could be canned.

TABLE 1

| | Group | | |
|---|---|---|---|
| | 1 | 2 | 3 |
| Particle size D90 of lamotrigine (um) | 4.4 | 60.6 | 150.0 |
| Lamotrigine | 10 | 10 | 10 |
| Mannitol | 20 | 20 | 20 |
| Lactose monohydrate | 20 | 20 | 20 |
| Microcrystalline cellulose | 20 | 20 | 20 |
| Sucralose | 1 | 1 | 1 |
| Xanthan gum | 3 | 3 | 3 |
| Silicon dioxide | 1 | 1 | 1 |
| Orange essence | 0.5 | 0.5 | 0.5 |
| Citric acid | 2.5 | 2.5 | 2.5 |
| Disodium hydrogen phosphate | 1.5 | 1.5 | 1.5 |
| Simethicone emulsion | 1.6 | 1.6 | 1.6 |
| Methylparaben sodium | 2 | 2 | 2 |
| Propylparaben sodium | 0.2 | 0.2 | 0.2 |

The lamotrigine dry suspending agents prepared according to the above method using lamotrigine with 3 different particle sizes based on the formulae in Table 1 have stable contents and physical and chemical properties of related substances. The physical and chemical properties of the reconstituted suspension can be stable for at least 3 M, that is, after the product is opened and reconstituted, the patient can use it consecutively for at least 3 M. As a result, the lamotrigine dry suspending agent prepared by the method of the present disclosure can cover a wide range of particle size of the API lamotrigine, i.e., can basically cover all particle sizes of lamotrigine in factories. According to this embodiment, the particle size D90 of the API lamotrigine can cover a range of 1 to 200 um.

Embodiment 2—Preparation of Dry Suspending Agents by Hydrate Filtration Using Lamotrigine Anhydrates with Different Particle Sizes 10 parts by weight of lamotrigine anhydrates with (D90) of 4 um, 60 um and 150 um were respectively added to 100 parts by weight of purified water, and stirred for dispersion at a speed of 800 rpm at room temperature for 3 h to obtain lamotrigine hydrate crystals. A series of characteristic peaks of the anhydrate in the XRPD spectrum at diffraction angles (2θ) of 12.3±0.2°, 13.7±0.2°, 16.5±0.2°, 17.3±0.2° and 17.8±0.2° were not obvious in the hydrate crystal, and the hydrate had a series of characteristic peaks of hydrate at diffraction angles (2θ) of 10.69±0.2°, 13.12±0.2° and 15.73±0.2°, indicating that the lamotrigine anhydrate had transformed into the hydrate crystal. The suspension was filtered to obtain lamotrigine wet granules. The lamotrigine wet granules were dried with a fluidized bed, of which the inlet air temperature was set to 60° C. Then, the lamotrigine dry granules were milled by a mill to a particle size D90 of about 30 um.

The formulae are show in Table 2. The milled lamotrigine hydrate and other materials (in parts by weight) in Table 2 were placed in a hopper with a suitable size, mixed at a speed of 20 rpm for 5 min, and passed through a 475 um screen. Then, the undersize was placed in the hopper and mixed for 10 min to obtain dry suspending agent powder that could be canned.

The lamotrigine dry suspending agents prepared according to the above method using initial API lamotrigine with 3 different particle sizes based on the formulae in Table 2 have stable contents, related substances, other physical and chemical properties. After filtration, the wet granules were dried in the air and tested for their crystals. In the XRPD spectrum, the series of characteristic peaks of hydrate still existed at diffraction angles (2θ) of 10.69±0.2°, 13.12±0.2° and 15.73±0.2°, indicating that the lamotrigine crystals in the suspending agent prepared according to the formulae by this process were still hydrate crystals. The physical and chemical properties of the reconstituted suspension can be stable for at least 3 M, that is, after the product is opened and reconstituted, the patient can use it consecutively for at least 3 M. As a result, the lamotrigine dry suspending agent prepared by the method of the present disclosure can cover a wide range of particle size of the API lamotrigine, i.e., can basically cover all particle sizes of lamotrigine in factories. According to this example, the particle size D90 of the API lamotrigine can cover a range of 1 to 200 um.

TABLE 2

|  | Group | | |
| --- | --- | --- | --- |
|  | 1 | 2 | 3 |
| Particle size D90 of lamotrigine (um) | 4.4 | 60.6 | 150.0 |
| Lamotrigine | 10 | 10 | 10 |
| Mannitol | 20 | 20 | 20 |
| Sucralose | 1 | 1 | 1 |
| Xanthan gum | 3 | 3 | 3 |
| Silicon dioxide | 1 | 1 | 1 |
| Orange essence | 0.5 | 0.5 | 0.5 |
| Citric acid | 2.5 | 2.5 | 2.5 |
| Disodium hydrogen phosphate | 1.5 | 1.5 | 1.5 |
| Methylparaben sodium | 2 | 2 | 2 |
| Propylparaben sodium | 0.2 | 0.2 | 0.2 |

Embodiment 3—Preparation of Dry Suspending Agents Using Lamotrigine Anhydrates with Different Particle Sizes 10 parts by weight of lamotrigine hydrate crystals with (D90) of 4 um, 60 um and 110 um were used, the XRPD spectrum of which showed that there were a series of characteristic peaks of hydrate at diffraction angles (2θ) of 10.69±0.2°, 13.12±0.2° and 15.73±0.2°. The formulae are shown in Table 2. All the materials in the formula were placed in a hopper with a suitable size, mixed at a speed of 20 rpm for 5 min, and passed through a 475 um screen. Then, the undersize was placed in the hopper and mixed for 10 min to obtain a dry suspending agent powder material that could be canned.

The lamotrigine dry suspending agents prepared according to the above method have stable contents, related substances, other physical and chemical properties. The physical and chemical properties of the reconstituted suspension can be stable for at least 3 M, that is, after the product is opened and reconstituted, the patient can use it consecutively for at least 3 M.

Embodiment 4—Preparation of Dry Suspending Agents Using Milled Intermediates with Different Particle Sizes 10 parts by weight of lamotrigine anhydrates with (D90) of 8 um were added to 30 parts by weight of purified water, and stirred for dispersion at a speed of 800 rpm at room temperature for 3 h to obtain a lamotrigine hydrate crystal. In the XRPD spectrum, there were a series of characteristic peaks of hydrate at diffraction angles (2θ) of 10.69±0.2°, 13.12=0.2° and 15.73±0.2°, indicating that the lamotrigine anhydrate had transformed into the hydrate crystal.

The resulting suspension was added as a slurry to a mixture of 20 parts by weight of mannitol, 20 parts by weight of lactose and 20 parts by weight of microcrystalline cellulose, and wet granulation was carried out at a stirring speed of 150 rpm and a shearing speed of 1500 rpm. After the completion of the wet granulation, the wet granules were passed through a 6250 um screen. The wet granules were dried with a fluidized bed, the inlet air temperature of which was set to 60° C. Then, the dry granules were evenly divided into 3 parts, which were respectively milled by a mill into intermediate materials with a particle size D90 of about 30 um, 70 um, 110 um and 320 um.

The milled materials each and other materials (in parts by weight) in Table 3 below were placed in a hopper with a suitable size, mixed at a speed of 20 rpm for 5 min, and passed through a 475 um screen. Then, the undersize was further mixed in the hopper for 10 min to obtain dry suspending agent powder that could be canned.

TABLE 3

|  | Group | | | |
| --- | --- | --- | --- | --- |
|  | 1 | 2 | 3 | 4 |
| Particle size D90 of API lamotrigine (um) | 8.3 | 8.3 | 8.3 | 8.3 |
| Lamotrigine | 10 | 10 | 10 | 10 |
| Mannitol | 20 | 20 | 20 | 20 |
| Lactose monohydrate | 20 | 20 | 20 | 20 |
| Microcrystalline cellulose | 20 | 20 | 20 | 20 |
| Particle size D90 of milled intermediate (um) | 26.5 | 71.7 | 108.5 | 320.6 |
| Sucralose | 1 | 1 | 1 | 1 |
| Xanthan gum | 3 | 3 | 3 | 3 |
| Silicon dioxide | 1 | 1 | 1 | 1 |
| Orange essence | 0.5 | 0.5 | 0.5 | 0.5 |
| Citric acid | 2.5 | 2.5 | 2.5 | 2.5 |
| Disodium hydrogen phosphate | 1.5 | 1.5 | 1.5 | 1.5 |
| Simethicone emulsion | 1.6 | 1.6 | 1.6 | 1.6 |
| Methylparaben sodium | 2 | 2 | 2 | 2 |
| Propylparaben sodium | 0.2 | 0.2 | 0.2 | 0.2 |

The dry suspending agents prepared according to the above method using milled intermediates with 3 different particle sizes based on the formulae in Table 3 have stable contents, related substances, other physical and chemical properties. The physical and chemical properties of the reconstituted suspension can be stable for at least 3 M, that is, after the product is opened and reconstituted, the patient can use it consecutively for at least 3 M. This indicates that the particle size of the milled intermediate can be acceptable at least within the range of 20 to 400 um.

Embodiment 5—Preparation of Dry Suspending Agents Using Mixture of Different Forms of Hydrate Crystals Solid powders of different forms of lamotrigine hydrates were prepared, and milled to a particle size D90 of not greater than 110 um. According to Table 4, different forms of lamotrigine hydrates and other materials (in parts by weight) were placed together in a hopper with a suitable size, mixed at a speed of 20 rpm for 5 min, and passed through a 475 um screen. Then, the undersize was placed in the hopper and mixed for 10 min to obtain dry suspending agent powder that could be canned.

TABLE 4

| | Group | | |
|---|---|---|---|
| | 1 | 2 | 3 |
| Lamotrigine hydrate | Form II:Form A 1:9 | Form II:Form A 5:5 | Form II:Form A 9:1 |
| Mannitol | 20 | 20 | 20 |
| Sucralose | 1 | 1 | 1 |
| Xanthan gum | 3 | 3 | 3 |
| Silicon dioxide | 1 | 1 | 1 |
| Orange essence | 0.5 | 0.5 | 0.5 |
| Citric acid | 2.5 | 2.5 | 2.5 |
| Disodium hydrogen phosphate | 1.5 | 1.5 | 1.5 |
| Methylparaben sodium | 2 | 2 | 2 |
| Propylparaben sodium | 0.2 | 0.2 | 0.2 |

Dry suspending agents prepared according to the above method using 2 different forms of lamotrigine hydrates in different ratios based on the formulae in Table 4 have stable contents, related substances, other physical and chemical properties. The XRPD spectrum of Form II showed that there were a series of characteristic peaks of hydrate at diffraction angles (2θ) of 10.69±0.2°, 13.12±0.2° and 15.73±0.2°, and the XRPD spectrum of Form A showed that there were a series of characteristic peaks of hydrate at diffraction angles (2θ) of 11.44.69±0.2°, 13.302±0.2 and 14.90±0.2. The inventors also found that when the reconstituted suspensions were respectively placed at high temperatures of 40° C. and 60° C., characteristic peaks of both of the two forms of hydrates were detected in the suspension at 40° C. after 2 M, but in the suspension at 60° C. after 2 M, only characteristic peaks of Form II were detected, and there were no obvious characteristic peaks of Form A.

The two forms of lamotrigine with the same mass were respectively mixed with purified water and placed at high temperatures of 40° C. and 60° C. After 2 M, in the suspensions at both of the two temperatures, only characteristic peaks of Form II were detected, and there were no obvious characteristic peaks of Form A.

According to the above test results, it can also be concluded that Form A is the intermediate form of Form II, and Form II is a more stable form.

Embodiment 6—Dry Suspending Agents Prepared by Different Drying Processes 10 parts by weight of lamotrigine anhydrates with (D90) of 4 um were respectively added to 30 parts by weight of purified water, and stirred for dispersion at a speed of 800 rpm at room temperature for 3 h to obtain lamotrigine hydrate crystals. A series of characteristic peaks of the anhydrate in the XRPD spectrum at diffraction angles (2θ) of 12.3±0.2°, 13.7±0.2°, 16.5±0.2°, 17.3=0.2° and 17.8±0.2° were not obvious in the hydrate crystal, and the hydrate had a series of characteristic peaks of hydrate at diffraction angles (2θ) of 10.69±0.2°, 13.12±0.2° and 15.73±0.2°, indicating that the lamotrigine anhydrate had transformed into the hydrate crystal.

The resulting suspension was added as a slurry to a mixture of 20 parts by weight of mannitol, 20 parts by weight of lactose and 20 parts by weight of microcrystalline cellulose, and wet granulation was carried out at a stirring speed of 150 rpm and a shearing speed of 1500 rpm. After the completion of the wet granulation, the wet soft material was passed through a 6250 um screen. The above material were divided into two parts. One part of the wet soft material was dried with a fluidized bed (Group 1), the inlet air temperature of which was set to 60° C. The other part of the material was dried by oven heating (Group 2). The temperature of the oven was set to 50° C. In both of the processes, the materials were dried until LOD≤2.0%. Then, the dried materials were respectively milled by a mill to a particle size D90 of about 70 um.

The milled materials each and other materials (in parts by weight) in Table 8 below were placed in a hopper with a suitable size, mixed at a speed of 20 rpm for 5 min, and passed through a 475 um screen. Then, the undersize was further mixed in the hopper for 10 min to obtain dry suspending agent powder that could be canned.

TABLE 8

| | Group | |
|---|---|---|
| | 1 | 2 |
| Material drying process | Fluidized bed drying | Oven drying |
| Particle size D90 of lamotrigine (um) | 4.4 | 4.4 |
| Lamotrigine | 10 | 10 |
| Mannitol | 20 | 20 |
| Lactose monohydrate | 20 | 20 |
| Microcrystalline cellulose | 20 | 20 |
| Sucralose | 1 | 1 |
| Xanthan gum | 3 | 3 |
| Silicon dioxide | 1 | 1 |
| Orange essence | 0.5 | 0.5 |
| Citric acid | 2.5 | 2.5 |
| Disodium hydrogen phosphate | 1.5 | 1.5 |
| Simethicone emulsion | 1.6 | 1.6 |
| Methylparaben sodium | 2 | 2 |
| Propylparaben sodium | 0.2 | 0.2 |

The lamotrigine dry suspending agents prepared according to the above method using 2 different drying processes based on the formulae in Table 8 have stable contents, related substances, other physical and chemical properties. The physical and chemical properties of the reconstituted suspensions can be stable for at least 3 M. That is, both the fluidized bed drying and the oven drying can be used to dry the wet materials obtained by wet granulation to prepare satisfactory lamotrigine dry suspending agents.

The above examples only express several embodiments of the present disclosure, which are specifically described in detail, but this should not be understood as limiting the scope of the present disclosure. It should be noted that for those of ordinary skills in the art, several variations and modifications can be made without departing from the concept of the present disclosure, and these variations and modifications are all within the scope of protection of the present disclosure. Therefore, the scope of protection of the present disclosure shall be subject to the appended claims.

The invention claimed is:

1. A method of preparing a powder for reconstitution into a suspension, comprising:
    (a) providing particles comprising lamotrigine hydrate optionally admixed with a first set of excipients;
    (b) processing the particles so that their D90 is less than 500 μm; and
    (c) mixing the processed particles with a second set of excipients comprising at least a thickener to obtain the powder as a uniform mixture,
    wherein the lamotrigine hydrate ranges from 5% to 60% in the uniform mixture.

2. The method of claim 1, the lamotrigine hydrate of the particles of step (a) is admixed with the first set of excipients comprising one or more excipients selected from the group consisting of a filler, a sweetener, a pH modifier, a preservative, a glidant, an anti-forming agent, a flavoring agent, and a surfactant.

3. The method of claim 1, wherein the particles of step (a) consist essentially of the lamotrigine hydrate.

4. The method of claim 1, wherein the second set of excipients further comprises one or more excipients selected from the group consisting of a sweetener, a pH modifier, a preservative, a glidant, an anti-forming agent, a flavoring agent.

5. The method of claim 1, wherein the weight ratio of the lamotrigine hydrate to the pH modifier is from about 10:0.1 to about 10:8.

6. The method of claim 1, the weight ratio of the lamotrigine hydrate to the at least a thickener is from about 10:1 to about 10:7.

7. The method of claim 1, wherein the at least a thickener is selected from the group consisting of xanthan gum, guar gum, locust bean gum, carrageenan, sodium carboxymethyl cellulose, hydroxypropyl cellulose, methyl cellulose, hydroxypropyl methyl cellulose, starch, pre-gelatinized starch, alginate, acrylic copolymer, and aluminum magnesium silicate.

8. The method of claim 1, further comprising, prior to step (a), adding anhydrous lamotrigine to water to obtain the lamotrigine hydrate in a suspension.

9. The method of claim 8, further comprising isolating the lamotrigine hydrate from the suspension and removing excess water from the lamotrigine hydrate to form the particles.

10. The method of claim 8, further comprising mixing the suspension with the first set of excipients to obtain wet granules comprising the lamotrigine hydrate, and removing excess water from the granules to form the particles.

11. The method of claim 1, wherein the uniform mixture further comprises a pH modifier, which provides a pH ranging from about 3.0 to about 8.0.

12. The method of claim 1, wherein the powder, after being prepared into the suspension, provides regenerated particles of lamotrigine hydrate, wherein the regenerated particles maintain a D90 of less than 500 μm for a period of at least 3 months in the suspension.

13. The method of claim 1, further comprising filtering the uniform mixture with a mesh having a size less than 1000 μm.

14. The method of claim 1, the particles of step (a) are essentially free from any thickener.

15. A powder for suspension prepared according to the method of claim 1.

16. A powder for suspension comprising a therapeutically effective amount of lamotrigine hydrate having D90 of less than 200 pm, a thickener, a sweetener, a pH modifier, a preservative, a glidant, an anti-forming agent, a flavoring agent, wherein the lamotrigine hydrate ranges from 5% to 60% in the powder.

17. The powder of claim 16, wherein thickener is selected from the group consisting of xanthan gum, povidone, sodium carboxymethylcellulose, sodium alginate, magnesium aluminum silicate, carbomer.

18. A method of treating a neurological disorder in a subject, comprising administer a suspension prepared from the powder of claim 16 to the subject in need thereof.

19. The method of claim 18, wherein the neurological disorder is selected from one or more of Alzheimer's disease, depression, multiple sclerosis, Parkinson's disease, and epilepsy.

20. The method of claim 18, further comprising administer to the subject an agent selected from the group consisting of oxcarbazepine, carbamazepine, topiramate, lacosamide, valproic acid, thosuximid, fibamat, gabapentin, levetiracetam, tiagabine, pregabalin, phenobarbital, zonisamid, clonazepam, phenytoin, valproate, clobazam, vigabatrin, and lacaramid.

* * * * *